(12) United States Patent
Karaoguz et al.

(10) Patent No.: US 9,204,274 B2
(45) Date of Patent: Dec. 1, 2015

(54) PROVIDING USER-SPOT (U-SPOT) SERVICES IN A COMMUNICATION SYSTEM

(71) Applicant: Broadcom Corporation, Irvine, CA (US)

(72) Inventors: Jeyhan Karaoguz, Irvine, CA (US); James D. Bennett, Hroznetin (CZ)

(73) Assignee: Broadcom Corporation, Irvine, CA (US)

(*) Notice: Subject to any disclaimer, the term of this patent is extended or adjusted under 35 U.S.C. 154(b) by 286 days.

(21) Appl. No.: 13/969,120

(22) Filed: Aug. 16, 2013

(65) Prior Publication Data

US 2013/0336217 A1    Dec. 19, 2013

Related U.S. Application Data

(63) Continuation of application No. 12/327,295, filed on Dec. 3, 2008, now Pat. No. 8,537,793.

(51) Int. Cl.
| H04W 4/00 | (2009.01) |
| H04W 4/20 | (2009.01) |
| H04W 8/00 | (2009.01) |
| H04L 29/08 | (2006.01) |

(52) U.S. Cl.
CPC ............... *H04W 4/20* (2013.01); *H04L 67/04* (2013.01); *H04L 67/12* (2013.01); *H04L 67/16* (2013.01); *H04W 8/005* (2013.01)

(58) Field of Classification Search
CPC ......... H04W 4/20; H04W 4/206; H04W 4/22; H04W 4/18; H04W 8/005; H04L 67/02; H04L 67/04; H04L 67/12; H04L 67/16; H04L 67/18
See application file for complete search history.

(56) References Cited

U.S. PATENT DOCUMENTS

| 6,874,018 | B2 | 3/2005 | Wu |
| 7,043,225 | B1 | 5/2006 | Patel et al. |
| 7,292,844 | B2 * | 11/2007 | Dowling et al. ........... 455/414.3 |
| 7,339,940 | B2 | 3/2008 | Boberg et al. |
| 7,689,681 | B1 | 3/2010 | David |
| 2003/0229900 | A1 * | 12/2003 | Reisman ......................... 725/87 |
| 2004/0139204 | A1 * | 7/2004 | Ergezinger et al. ........... 709/229 |
| 2005/0041641 | A1 | 2/2005 | Cooley |
| 2005/0210251 | A1 | 9/2005 | Nyberg et al. |
| 2005/0239495 | A1 | 10/2005 | Bayne |
| 2005/0305795 | A1 | 12/2005 | Murakami et al. |
| 2005/0313543 | A1 | 12/2005 | Altberg et al. |

(Continued)

*Primary Examiner* — Kevin Mew
(74) *Attorney, Agent, or Firm* — Brinks Gilson & Lione (57) ABSTRACT

A mobile communication device may be utilized to establish a localized user network that is accessible by client devices when the client devices are communicatively coupled to the mobile communication device. The mobile communication device is then operable to determine services that may be provided in the user network to the client devices, and to advertise these services within the user network. The services comprise network and/or data accessibility, and bandwidth availability. Mobile communication devices are also operable to provide, directly or via local and/or remote resources, additional services, comprising audio/video processing capability, storage, and/or processing. Offering of services in user networks is incentivized to the mobile communication devices and/or to client devices. Incentives comprise offering pay and/or credit to the mobile communication devices. Providing access to, blocking, limiting and/or modifying available/offered services is managed in U-Spot networks, based on incentives and/or availability of resources.

20 Claims, 6 Drawing Sheets

(56) References Cited

U.S. PATENT DOCUMENTS

| | | |
|---|---|---|
| 2006/0077986 A1 | 4/2006 | Rune |
| 2007/0008937 A1 | 1/2007 | Mody et al. |
| 2007/0083408 A1* | 4/2007 | Altberg et al. .................... 705/7 |
| 2007/0121848 A1* | 5/2007 | Faber et al. .............. 379/114.13 |
| 2007/0202865 A1 | 8/2007 | Moride |
| 2007/0274233 A1 | 11/2007 | Ptashek et al. |
| 2008/0076419 A1* | 3/2008 | Khetawat et al. .......... 455/435.1 |
| 2008/0263460 A1* | 10/2008 | Altberg et al. ................ 715/757 |
| 2009/0088219 A1 | 4/2009 | Bayne |
| 2009/0125343 A1 | 5/2009 | Cradick et al. |
| 2009/0164547 A1 | 6/2009 | Ch'ng et al. |
| 2009/0215477 A1 | 8/2009 | Lee et al. |
| 2010/0061294 A1* | 3/2010 | Proctor et al. ................ 370/328 |
| 2014/0109167 A1* | 4/2014 | Alao et al. .................... 725/147 |

\* cited by examiner

PROVIDING USER-SPOT (U-SPOT) SERVICES IN A COMMUNICATION SYSTEM

CROSS REFERENCE TO RELATED APPLICATIONS

This application is a continuation of application Ser. No. 12/327,295, filed Dec. 3, 2008, pending, which is incorporated herein by reference in its entirety.

This application makes reference to:
U.S. application Ser. No. 12/367,103 filed on Feb. 6, 2009 and issued as U.S. Pat. No. 8,149,735 on Apr. 3, 2012;
U.S. application Ser. No. 12/327,265 filed on Dec. 3, 2008, pending; and
U.S. application Ser. No. 12/367,142 filed on Feb. 6, 2009.

Each of the above stated applications is hereby incorporated herein by reference in its entirety.

TECHNICAL FIELD

Certain embodiments of the invention relate to communications. More specifically, certain embodiments of the invention relate to a method and system for providing user-spot (U-Spot) services in a communication system.

BACKGROUND

The growth of system connectivity has been one of the major developments in recent years. Fewer and fewer systems are operating as stand-alone system, and most of today's systems are increasingly becoming elements of one or more larger or complex networks. This growth in various networking technologies have provided improved performance and increased flexibility for these networks. Various wired and/or wireless based communication standards have been developed to satisfy demands for ever expanding system connectivity. The growth of system connectivity has also spurred a growth in applications that takes advantage of the benefits offered by the improved system connectivity, especially those having access to entities that provides improved processing and/or storage capabilities.

Communication end-point devices, which are mobile and/or stationary, comprise a plurality of wireless technologies to enable use of various interfaces for transmitting and/or receiving data. For example, mobile devices, which enable cellular connectivity, have become a near absolute necessity in today's world. While mobile technology originally evolved from traditional land-based communication technologies, and was merely intended to add an element of mobility to the traditional telephony service, this technology has grown beyond that initial purpose. Many modern mobile technologies, including such technologies as GSM/GPRS/EDGE, UMTS, CDMA2000, and/or LTE, incorporate substantial data capabilities. Most of today's mobile services comprise such features as text messaging, audio/video streaming, and web browsing. Modern mobile devices, for example cell phones and/or smart phones, are utilized to support additional services via other wireless interfaces, for example, wireless personal area networks (WPAN) and/or wireless local area network (WLAN) interfaces.

The use of wireless personal area networks (WPAN) continues to gain popularity in a great number of applications because of the flexibility and convenience in connectivity they provide. WPAN systems generally replace cumbersome cabling and/or wiring used to connect peripheral devices and/or mobile terminals by providing short distance wireless links that allow connectivity within very narrow spatial limits (typically, a 10-meter range). An exemplary WPAN system utilizes a standardized technology such as Class 2 Bluetooth (BT) technology.

While WPAN are very beneficial for certain applications, other applications require larger service areas and/or capabilities. To satisfy such needs, other technologies such as Wireless local area networks (WLAN) have been developed to provide greater wireless service. In contrast to the WPAN systems, WLAN provide connectivity to devices that are located within a slightly larger geographical area, such as the area covered by a building or a campus, for example. WLAN systems are generally based on specific standards, for example IEEE 802.11 standard specifications, and typically operate within a 100-meter range, and are generally utilized to supplement the communication capacity provided by traditional wired Local Area Networks (LANs) installed in the same geographic area as the WLAN system.

Some WLAN systems are operated in conjunction with WPAN systems to provide users with an enhanced overall functionality. For example, Bluetooth technology is utilized to connect a laptop computer or a handheld wireless terminal to a peripheral device, such as a keyboard, mouse, headphone, and/or printer, while the laptop computer or the handheld wireless terminal is also connected to a campus-wide WLAN network through an access point (AP) located within the building. Also, mobile technology enables the use of the mobile phone as a form of wireless modem that allows connecting a laptop, for example, to the internet via a mobile network. More recently, Worldwide Interoperability for Microwave Access (WiMAX) based systems have become popular, and use of WiMAX to provide wireless connectivity is expanding.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and/or method is provided for providing user-spot (U-Spot) services in a communication system, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION

Certain embodiments of the invention may be found in a method and system for providing user-spot (U-Spot) services in a communication system. In various embodiments of the invention, mobile communication devices are operable to establish and service private user based networks which may also be referred to as user spot (U-Spot) networks. The mobile communication devices are operable to determine services that are available, via the corresponding U-Spot networks, to one or more client end-point devices when the client end-point devices are communicatively coupled to the mobile communication devices, via wired and/or wireless links. The services are based on network access, data accessibility and/or functionality available via the mobile communication devices. Available services are advertised in the U-Spot networks, via the mobile communication devices. The advertisement operations are performed via beacons and/or utilizing, for example, personalized markup language interfaces such as HTML, XML, and/or other suitable text, audio and/or video interfaces. Secondary devices and/or systems, external to and/or remote from the mobile communication devices, are operable to advertise and/or offer content or functionality via the advertising functionality in the mobile communication devices.

The mobile communication devices are also operable to utilize local and/or remote resources to provide additional services, including, for example, audio and/or video processing capability, storage, and/or processing. The offering and/or requesting of services in the U-Spot networks is incentivized to the mobile communication devices and/or to the client end-point devices. The mobile communication devices are operable to request and/or receive pay and/or credit for providing services. Accounts corresponding to the client end-point devices may also be debited based on services received via the U-Spot networks. Servicing operations in the U-Spot networks may be supported and/or managed by network service providers, via operator support servers for example. The operator support servers enable managing, for example, user accounts and/or network accessibility provided via the U-Spot networks, and/or managing crediting/billing operations based on servicing operations in the U-Spot networks. Communication in the U-Spot networks may be secured, wherein security and/or authentication operations are utilized to validate user access and/or accounting adjustments made and/or requested based on services provided via the U-Spot networks.

Figure 1:
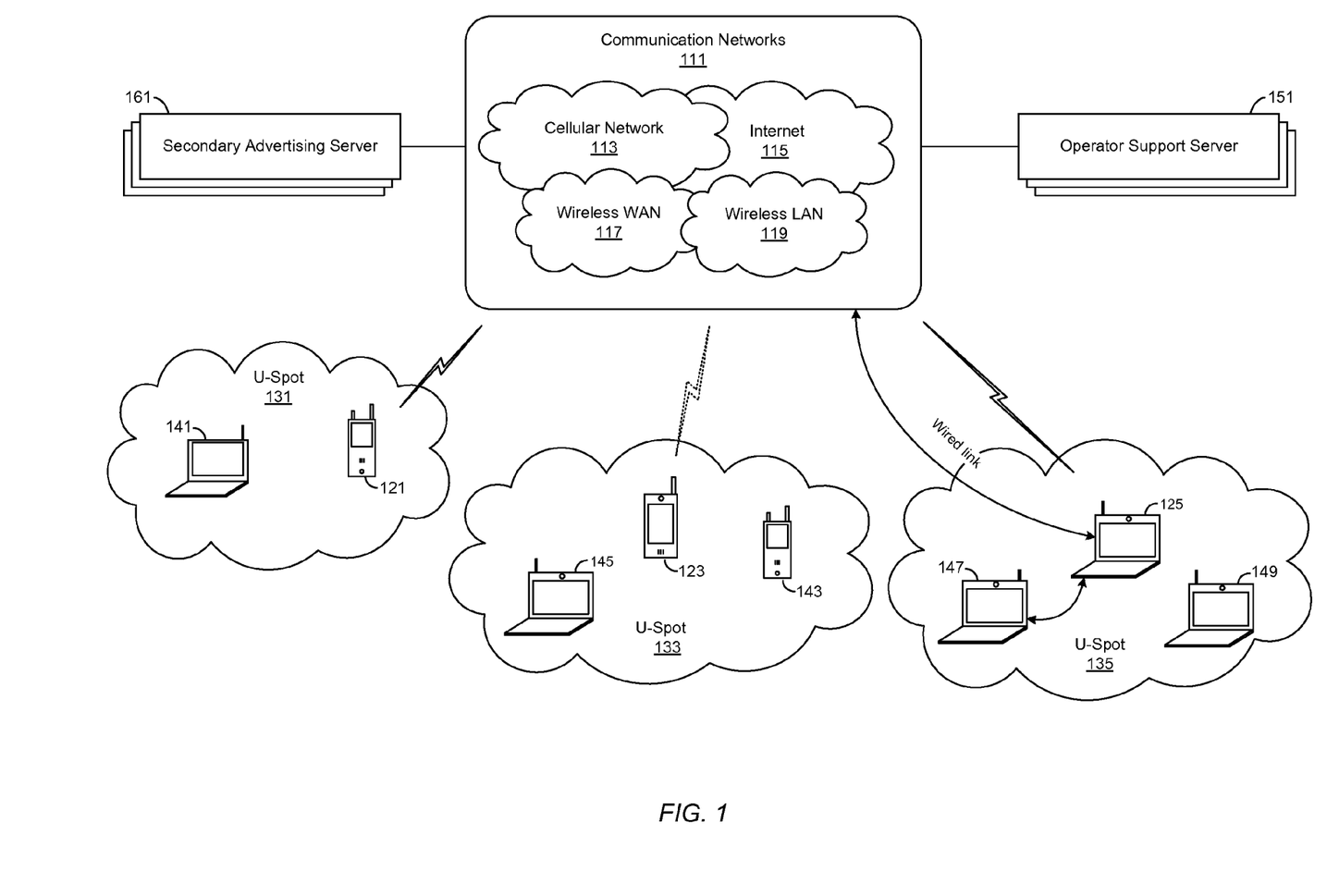
FIG. 1 is a block diagram that illustrates an exemplary system for providing user-spot (U-Spot) services, in accordance with an embodiment of the invention.

FIG. 1 is a block diagram that illustrates an exemplary system for providing user-spot (U-Spot) services, in accordance with an embodiment of the invention. Referring to FIG. 1, there is shown a plurality of communication networks 111, a cellular network 113, Internet 115, wireless wide area network (WWAN) 117, a wireless local area network (WLAN) 119, U-spot servicing devices 121, 123, 125, U-Spot networks 131, 133, and 135, communication devices 141, 143, 145, 147, and 149, one or more operator support servers 151, and one or more secondary advertising servers 161.

The plurality of communication networks 111 comprises one or more networks that are operable to enable wireless and/or wired communication among a plurality of local and/or remote entities. The network connectivity available via the plurality of communication networks 111 is based on one or more communication standards and/or protocols. The plurality of communication networks 111 comprises, for example, the cellular network 113, the Internet 115, the WWAN 117, and/or the WLAN 119. The cellular network 113 comprises suitable logic, circuitry and/or code that enable communication via one or more cellular technologies. Exemplary cellular technologies comprise CDMA, WCDMA, CDMA1000, HSDPA, GSM, GPRS, EDGE, and/or UMTS. The cellular network 113 comprise, for example, a plurality of control and/or switching nodes, and a plurality of base stations that enable transmission and/or reception of cellular based communications between the cellular network 113 and cellular capable devices. The Internet 115 comprises a system of interconnected networks to enable exchange of data between a plurality of nodes, based on one or more networking standards, including, for example, the Internet protocol (IP). For example, the Internet 115 enables connectivity among a plurality of private and public, academic, business, and/or government nodes and networks. The physical connectivity is provided in the Internet 115, for example, via the Public Switched Telephone Network (PSTN), via copper wires, fiber-optic cables, wireless interface, and/or other standards-based interfaces. The transport functionality is performed in the Internet 115, for example, based on one or more protocols, including, for example, the TCP/IP protocol.

The WWAN 117 comprises suitable logic, circuitry and/or code that enable implementation of one or more wireless wide network area standards and/or protocols. Exemplary wireless wide network area technologies comprise, for example, WiMAX based networks. The WLAN 119 comprises suitable logic, circuitry and/or code that enable implementation of one or more wireless local network area standards and/or protocols. Exemplary wireless local network area technologies comprise, for example, 802.11 based standards, including, for example, WiFi based networks.

Each of the communication devices 141, 143, 145, 147, and 149 comprises a personal end-point device and/or system that is operable to enable performing tasks and/or applications requested via users of the communication devices. In an exemplary aspect of the invention, the communication devices 141, 143, 145, 147, and 149 are operable to communicate with one or more the U-Spot servicing devices 121, 123, and/or 125 to form communication paths that support one or more applications that originate or terminate in the communication devices. Exemplary devices comprise PDAs, Smart phones, laptops and/or other PCs that are operable to enable utilizing at least one wired or wireless communication interface. Exemplary wireless and/or wired interfaces comprise, for example, WiFi, Bluetooth and/or other personal area network (WPAN) based interfaces, USB, and/or proprietary inter-device standards based interfaces.

Each of the U-spot servicing devices 121, 123, and 125 comprises a portable end-point device that is operable to establish and/or service the U-Spot networks 131, 133, and 135. Each of the U-spot servicing devices 121, 123, and 125 comprises a portable communication device that is substantially similar to any of the communication devices 141, 143, 145, 147, and/or 149, and is similarly operable to perform tasks and/or applications requested by the devices' users. Additionally, each of the U-spot servicing devices 121, 123, and 125 comprises suitable logic, circuitry and/or code that enable performing U-Spot related setup, management, and/or control operations in the U-Spot networks 131, 133, and/or 135. In order to facilitate providing network accessibility servicing via U-Spot networks, the U-spot servicing devices 121, 123, and/or 125 are operable to enable network connectivity to one or more of the communication networks 111, via one or more wireless and/or wired interfaces. For example, each the U-spot servicing devices 121, 123, and 125 are operable to utilize cellular links, Ethernet links, WiMAX links, and/or 802.11 links to enable establishing network connectivity via cellular network 113, the Internet 115, the WWAN 117, and/or the WLAN 119.

The operator support server 151 comprises suitable logic, circuitry, and/or code that enable providing and/or managing network accessibility. The operator support server 151 is utilized, for example, by service providers to enable providing access to one or more of the plurality of communication networks 111 to a plurality of users. The operator support server 151 is operable, for example, to enable managing users accounts and/or network access that correspond to users of any of the U-spot servicing devices 121, 123, and/or 125, and/or any of the communication devices 141, 143, 145, 147, and/or 149.

The secondary advertising server 161 comprises suitable logic, circuitry, and/or code that enable providing supporting and/or supplementing advertising operations in the U-Spot networks 131, 133, and/or 135; via the U-spot servicing devices 121, 123, and/or 125.

In operation, the U-Spot servicing devices 121, 123, and/or 125 enable establishing the U-Spot networks 131, 133, and/or 135, respectively. The U-Spot networks represent, for example, localized networks wherein user end-point devices present within operational proximity of the U-Spot servicing devices establish connectivity with the U-Spot servicing devices to request and/or receive services available in the U-Spot network. For example, the U-Spot servicing device 125 establish the U-Spot 135, wherein a plurality of services, provided via the U-Spot servicing device 125, are available in the U-Spot network 135.

The services provided via the U-Spot 135 comprise, for example, network accessibility. For example, the U-Spot servicing device 125 is communicatively coupled to one or more of the plurality of the communication networks 111, via one or more wired and/or wireless links. The U-Spot servicing device's 125 connectivity is established, for example, via a WiMAX wireless link, a cellular link, an 802.11 link, an Ethernet based wired connection, and/or fiber optical cables. Accordingly, the communication devices 147 and/or 149 request network connectivity through the U-Spot network 135, via the U-Spot servicing device 125. For example, there are instances when the communication device 147 has no direct network access to the plurality of communication networks 111. The communication device 147 establishes, instead, a connection with the U-Spot servicing device 125, to gain network access, via the U-Spot servicing device 125 network connectivity. The connection between the communication device 147 and the U-Spot servicing device 125 is set up via a wireless connection, over Bluetooth link for example, and/or via a wired connection such as an Ethernet crossover cable, for example.

The U-Spot servicing device 125's network connectivity is also utilized when the requesting device has some network access of its own. For example, where the communication device 149 has only 802.11 network accessibility, the U-Spot servicing device 125's network connectivity via a WiMAX link and/or a 3G cellular link, for example, is deemed to be more desirable, due to higher bandwidth, quality of service (QOS), and/or network performance. In addition to network accessibility, other services are available via U-Spot networks. Where the U-Spot servicing device 123 loses its connectivity to the plurality of communication networks 111, for example, the U-Spot servicing device 123 offers, via the U-Spot network 133, services based on data and/or functionality that is available locally within the U-Spot servicing device 123, which is available in the U-Spot network 133 regardless of availability of network accessibility in the U-Spot servicing device 123. For example, the communication devices 143 and/or 145 are operable to connect to the U-Spot servicing device 123, via an 802.11 link for example, to request and/or retrieve video and/or audio streams that are stored in and/or played via the U-Spot servicing device 123. The U-Spot servicing device 123 may also be operable as a centralized gaming console to provide gaming applications in the U-Spot network 133 based on internally maintained data and/or functionality.

In an exemplary aspect of the invention, U-Spot network servicing operations are incentivized. In this regard, the U-Spot servicing operations are incentivized to the U-Spot servicing devices, for example, by enabling them, and/or their users, to claim pay and/or credit for provide U-Spot services. The credit received for providing U-Spot network services is utilized, for example, to compensate for costs otherwise charged by a service provider when the U-Spot servicing devices are utilized as user end-point devices. The user accounts corresponding to the devices utilizing the U-Spot network servicing operations are adjusted to bill and/or debit their users for services provided via the U-Spot networks. The operator support server 151 is operable, for example, to manage accounts corresponding to the U-Spot servicing device 125 and/or the communication devices 147 and/or 149. Accordingly, the U-Spot servicing device 125 is operable to request credit and/or billing adjustments for servicing the communication devices 147 and/or 149, via the operator support server 151. Where the operator support server 151 does not directly manage the user account for either of the devices receiving and/or providing U-Spot services, the operator support server 151 communicates directly with other operator support servers to facilitate exchange of required user related information, to enable performing necessary billing and/or crediting adjustments. Alternatively, a centralized depository is utilized to enable indirect exchange of user related information by instances of the operator support server 151.

The U-Spot servicing operations may also be incentivized to the requesting devices, for example, because the U-Spot networks offer network accessibility, improved bandwidth, and more suitable content, functionality networking capabilities. In an exemplary aspect of the invention, the communication devices and the U-Spot servicing devices are operable to negotiate incentivized arrangements with respect, for example, to the requesting communication devices, the U-Spot servicing devices, and/or service providers, via instances of the operator support server 151. For example, where the U-Spot servicing device 121 is only offering 10% of its available network bandwidth for networking accessibility in the U-Spot network 131, the communication device 141 is operable to negotiate with the U-Spot servicing device 121 for allocation of 20% of the available bandwidth in exchange for larger credit and/or higher pay.

The U-Spot network functionality also comprises advertisement operations. For example, the U-Spot servicing devices 121, 123, and/or 125 are operable to transmit beacon signals. In addition to providing information that enable identifying and/or locating the U-Spot networks 131, 133, and/or 135, the beacons also comprise information advertising the services available in the U-Spot networks. In an exemplary aspect of the invention, the U-Spot servicing devices 121, 123, and/or 125 are also operable to utilize web-based communication functionality. The web-based communication functionality is operable, for example, to enable user-friendly interactions between the U-Spot servicing devices 121, 123, and/or 125, and communication devices in the U-Spot networks 131, 133, and/or 135. Additionally, the web-based communication functionality is operable to advertise services available in the corresponding U-Spot networks 131, 133, and/or 135. The U-Spot servicing devices 121, 123, and/or 125 are operable, for example, to create, via the web-based communication functionality, personalized markup language interfaces, comprising, for example, HTML, XML, and/or or other suitable text, audio and/or video interfaces. In an exemplary aspect of the invention, the personalized interface is utilized to create and/or manage an advertising and/or servicing webpage during interactions between servicing devices and requesting devices. Accordingly, the personalized interface enables users of the communication devices 141, 143, 145, 147, and/or 149, for example, to conveniently communicate with the U-Spot servicing devices to inquire about available services, and/or to request and/or receive services, for example downloading media streams. The personalized interfaces are also operable to enable performing incentivizing operations, including, for example, enabling the devices to negotiate and/or throttle bandwidth allocation. The U-Spot servicing devices 121, 123, and/or 125 are operable to enable secondary devices and/or systems, which are external to and/or remote from the servicing devices, to utilize their personalized interface functionality. For example, the secondary advertising server 161 is operable to create its own advertising webpage, and push the webpage via the personalized interfaces of U-Spot servicing devices 121, 123, and/or 125, to offer content and/or functionality available, directly or indirectly, via the secondary advertising server 161.

Figure 2A:
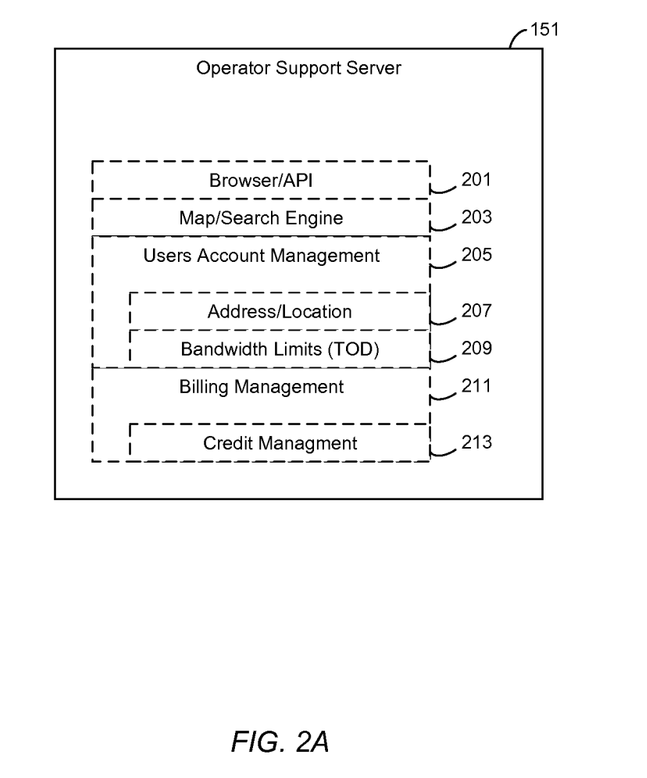
FIG. 2A is a block diagram that illustrates an exemplary operator support server that supports use of U-Spot networks, in accordance with an embodiment of the invention.

FIG. 2A is a block diagram that illustrates an exemplary operator support server that supports use of U-Spot networks, in accordance with an embodiment of the invention. Referring to FIG. 2A, there is shown the operator support server 151, a browser/application programming interface (browser/API) entity 201, a map/search engine 203, a user's account management 205, an address/location function 207, a bandwidth limitation function 209, a billing management 211, and a credit management function 213.

The operator support server 151 is substantially as described with respect to FIG. 1. In an exemplary embodiment of the invention, the operator support server 151 comprises a plurality of constituent functional entities to enable supporting U-Spot network. The operator support server 151 comprises, for example, the browser/API entity 201, the map/search engine 203, the users account management 205, and the billing management 211.

The browser/API entity 201 comprises suitable logic and/or code that enable communication between the operator support server 151 and other devices and/or systems. The browser/API entity 201 is operable, for example, to enable communication of messaging pertaining to support and/or management of U-Spot network services and/or to enable communication pertaining to user accounts, to request, for example, crediting and/or billing adjustments for one or more users serviced via the operator support server 151. The browser/API entity 201 is operable to enable supporting messaging that is based on application programming interface (API) which is specific to a functionality running in the operator support server 151 and is supported in devices communicating with the operator support server 151. Alternatively, the browser/API entity 201 is operable to enable, for example, remote access and/or communication based on an HTTP based browsing interface. Accordingly, the browser/API entity 201 enables running an HTTP based server functionality via the operator support server 151 that enable establishing peer-to-peer connection with HTTP based client functionality running in the requesting device. In an exemplary aspect of the invention, the browser/API entity 201 is also operable to enable communication among a plurality of the operator support servers 151, directly and/or indirectly via centralized depositories, during exchange of user account information, for example, for the purpose of performing crediting and/or billing operations.

The map/search engine 203 comprises suitable logic, circuitry and/or code that enable mapping specified locations to one or more devices operated and/or managed by the operator support server 151. The operator support server 151 is operable, for example, to receive requests for listing of U-Spot networks and/or services available via the U-Spot networks based on a specified location. The map/search engine 203 is then operable to enable determining and communication information pertaining to U-spot servicing devices based on the location of the requesting device. The determination of U-Spot servicing devices that are reported back is based on a plurality of factors, comprising, for example, suitability to provide services based on operational proximity of the devices and/or other conditions including, for example, specified services and/or parameters of services.

The user account management 205 comprises suitable logic, circuitry and/or code that enable management of user related information. The user account management 205 is utilized, for example, to enable setting up, storing, maintaining and/or updating a user's network access related information. The user account management 205 enable, for example, creation and/or maintenance of access information that enable identifying and/or authenticating users seeking to access one or more communication networks that are manageable via the operator support server 151, directly and/or via U-Spot network servicing. The user account management 205 is operable, for example, to perform user authentication based on SIM challenge wherein the SIM based information provided by communication devices are compared to stored information. The access information comprises various types of information, including, for example, user identifiers, user passwords, and/or location and/or addressing related information for devices used by users managed by the operator support server 151. At least some access information is provided directly by the operator support server 151. To enable performing the various user account related operations, dedicated sub-entities are utilized within the user account management 205. For example, the address/location functionality 207 comprises functionality that enables creating, managing, and/or modifying users location related information.

The address/location function 207 comprises suitable logic, circuitry and/or code that is operable to enable, for example, performing necessary mapping operations via the map/search engine 203. In an exemplary aspect of the invention, a users' location information is also generated and/or updated in the address/location functionality 207 during mapping operations in the map/search engine 203.

The bandwidth limitation function 209 comprises suitable logic, circuitry and/or code that comprises functionality that enables creating, managing, and/or modifying users bandwidth related information. The bandwidth limitation functionality 209 is operable, for example, to enable tracking bandwidth available, and applicable constraint thereof, via U-Spot servicing devices during U-Spot network servicing operations.

The billing management function 211 comprises suitable logic, circuitry and/or code that enable management of billing information via the operator support server 151. For example, the billing management 211 comprises functionality that enables setting up, storing, maintaining and/or updating users' billing information as it pertains to network accessibility provided via one or more communication devices that are supported and/or managed via the operator support server 151. In an exemplary aspect of the invention, the billing management 211 is operable to enable performing billing functionality related to U-Spot network servicing operations. For example, the billing management 211 is operable to enable billing users' accounts corresponding one or more of the communication devices 141, 143, 145, 147, and/or 149 when requesting and/or receiving services via the U-Spot networks 131, 133, and/or 135. The credit management 213 comprises functionality that is operable to perform crediting functions related to U-Spot network servicing operations. For example, the credit management 213 is operable to enable crediting users' accounts corresponding to one or more of the U-Spot servicing devices 121, 123, and/or 125 when providing services via the U-Spot networks 131, 133, and/or 135. The U-Spot based billing and/or crediting operations are performed via the billing management 211 and/or the credit management 213 based on messaging between the operator support server 151 and the requesting device, and/or based on messaging among a plurality of instances of the operator support server 151, substantially as described with regard to, for example, FIG. 1.

In operation, the browser/API entity 201, the map/search engine 203, the users account management 205, the address/location function 207, the bandwidth limitation function 209, the billing management 211, and/or the credit management function 213 are utilized to enable use of the operator support server 151 to manage and/or support U-Spot servicing operation via the U-Spot networks 131, 133, and/or 135. For example, the browser/API entity 201 is utilized to enable U-Spot servicing devices and/or requesting communication devices to communicate with the operator support server 151. The user account management 205, the address/location function 207, the bandwidth limitation function 209 are utilized to validate and/or manage users accounts and/or network access limitations and/or requirements. The map/search engine 203 and/or the address/location function 207 are utilized to provide mapping functionality that is utilized, for example, to enable communication devices to locate nearby U-Spot servicing devices. The billing management 211 and/or the credit management function 213 are utilized to enable performing billing/crediting operation that enable billing serviced communication devices and/or crediting and/or paying U-Spot servicing devices for services provided via U-Spot networks.

Figure 2B:
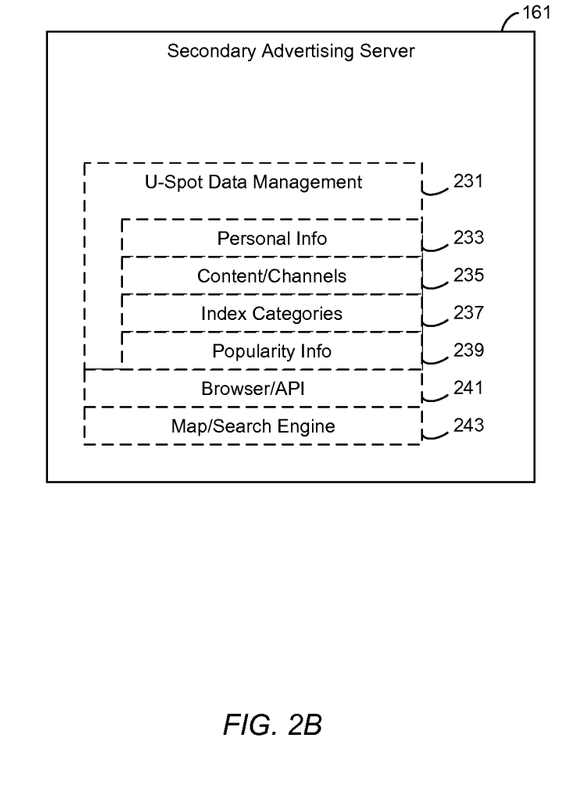
FIG. 2B is a block diagram that illustrates an exemplary secondary advertising server that supports use of U-Spot networks, in accordance with an embodiment of the invention.

FIG. 2B is a block diagram that illustrates an exemplary secondary advertising server that supports use of U-Spot networks, in accordance with an embodiment of the invention. Referring to FIG. 2A, there is shown the secondary advertising server 161, a U-Spot data management 231, a personal info entity 233, a content/channels entity 235, an index/categories entity 237, a popularity info entity 239, a browser/application programming interface (browser/API) entity 241, and a map/search engine 243.

The U-Spot data management function 231 comprises suitable logic, circuitry and/or code that enable management of advertising operations performed via U-Spot networks. The U-Spot data management 231 is utilized, for example, to enable creating webpage experience that is operable to communicate with, and/or advertise to users of communication devices serviced via U-Spot networks.

The personal info entity 233 is comprises suitable logic, circuitry and/or code that is operable to enable creating, storing, and/or updating information pertaining to particular users that is relevant to the personalization of webpages for example. This information comprises, for example, access validation information, accounting related information, bandwidth limitations, and/or location/mapping related information. The content/channels entity 235 comprises suitable logic, circuitry and/or code that are operable to enable creating, storing, and/or updating information that pertains to the contents that is offered via the advertised webpages, via the secondary advertising server 161. The index categories entity 237 comprises suitable logic, circuitry and/or code that are operable to create, store, and/or manage indexing of information and/or content available via the secondary advertising server 161. For example, the index categories entity 237 is operable to enable the U-Spot servicing device 123 to locate and access information that is utilized in advertising services and/or content to communication devices serviced via the U-Spot network 133. The popularity info entity 239 comprises suitable logic, circuitry and/or code that are operable to track, for example, current activity by users of communication devices, via the U-Spot networks, in order to predict potential future interests, to better optimize advertisement operations in the secondary advertising server 161, for example.

The browser/API entity 241 is substantially similar to the browser/API 201, as described with regard to, for example, FIG. 2A. The browser/API entity 241 is operable, for example, to enable communication between the secondary advertising server 161 and U-Spot servicing devices, for example one of the U-Spot servicing devices 121, 123 and 125, to enable providing remote advertising functionality via the U-Spot servicing devices during U-Spot network servicing operations.

The map/search engine 243 is substantially similar to the map/search engine 203, as described with regard to, for example, FIG. 2A. The map/search engine 243 is operable, for example, to enable communication between the secondary advertising server 161 and U-Spot servicing devices, for example one of the U-Spot servicing devices 121, 123 and 125, to enable providing remote advertising functionality via the U-Spot servicing devices during U-Spot network servicing operations.

In operation, the U-Spot data management 231, the personal info entity 233, the content/channels entity 235, the index/categories entity 237, the popularity info entity 239, the browser/application programming interface (browser/API) entity 241, and/or the map/search engine 243 are utilized to enable use of the secondary advertising server 161 to utilize advertising functionality available via the U-Spot networks 131, 133, and/or 135. For example, the browser/API entity 241 is utilized to enable U-Spot servicing devices and/or requesting communication devices to communicate with the secondary advertising server 161. The map/search engine 243 is utilized, for example, to provide mapping functionality that is utilized to enable matching communication devices to nearby U-Spot servicing devices. The U-Spot data management 231 is utilized to enable utilizing personalized interfaces available via the U-Spot servicing devices 121, 123, and/or 125, to advertise services and/or content available via the secondary advertising server 161. The personal info entity 233 is utilized to enable creating, storing, and/or updating users' information, which is pertinent, for example, to personalization of advertising webpages created via the secondary advertising server 161. The content/channels entity 235, the index categories entity 237, and/or the index categories entity 237 are operable to create content, provide access to information and/or content, and/or to track trends based on advertising operations provided by the secondary advertising server 161, via the U-Spot networks 131, 133, and/or 135.

Figure 3A:
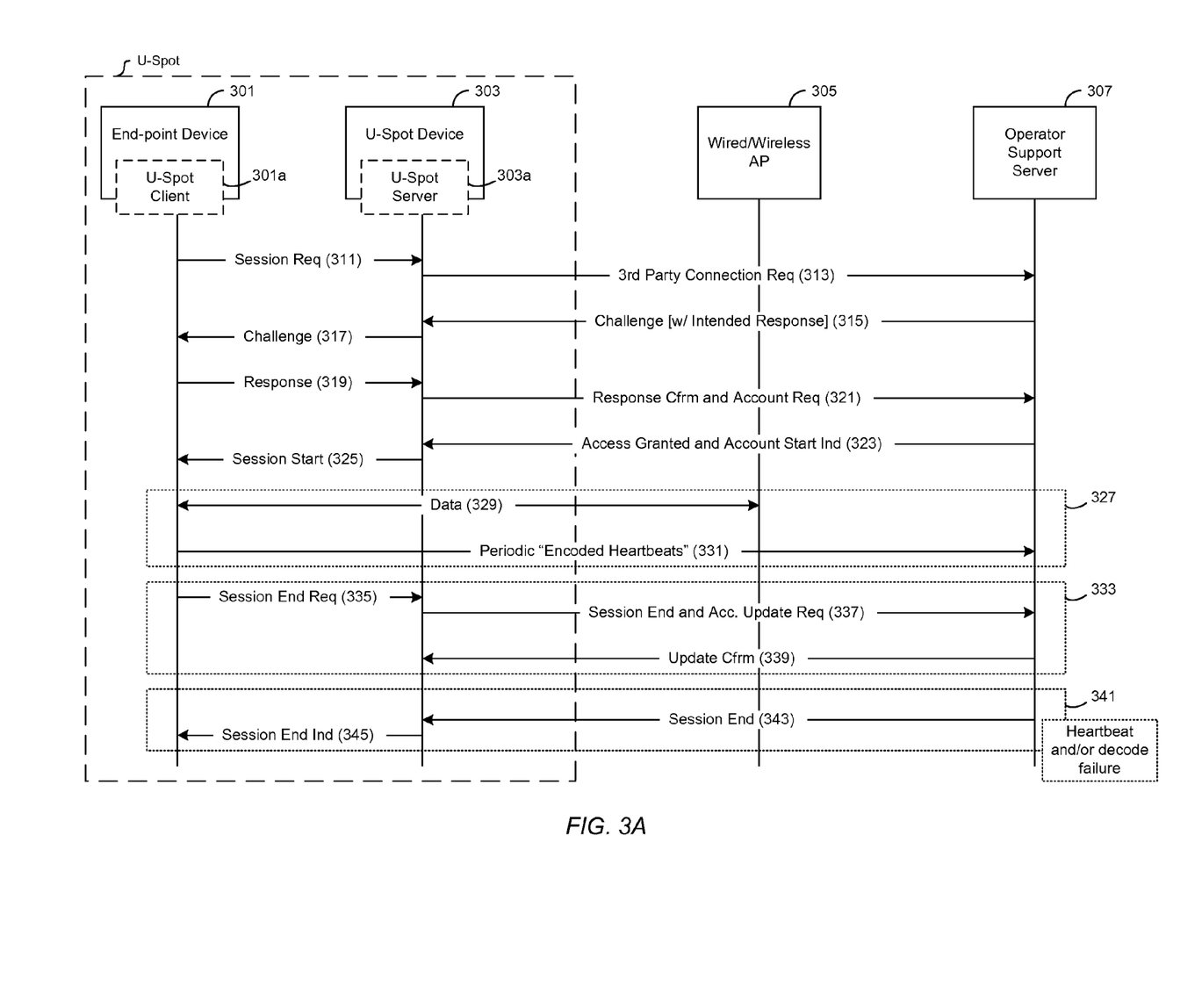
FIG. 3A is a diagram that illustrates an exemplary messaging sequence that enables establishment of service in an end-device via a U-Spot device that provides U-Spot server functionality, in accordance with an embodiment of the invention.

FIG. 3A is a diagram that illustrates an exemplary messaging sequence that enables establishing service in an end-point device via a U-Spot device that provides U-Spot server functionality, in accordance with an embodiment of the invention. Referring to FIG. 3A, there is shown a messaging flow chart that shows interactions between an end-point device 301, a U-Spot device 303, a wired/wireless access point (AP) 305, and an operator support server 307, to enable providing data session in the end-point device 301 when the U-Spot device 303 is actively managing the establishment of the data session.

The end-point device 301 comprises suitable logic, circuitry and/or code that is operable to receive services in U-Spot network via a U-Spot servicing device. The end-point 301 corresponds, for example, to any of the communication devices 141, 143, 145, 147, and/or 149, substantially as described with regard to, for example, FIG. 1. To enable performing U-Spot related operations via the end-point device 301, the end-point 301 comprises a U-Spot client 301a. For example, the U-Spot client 301a comprises logic, circuitry, and/or code that enable performing dedicated client-side U-Spot related control and/or communication in the end-point device 301. The U-Spot client 301a is operable to enable exchanging messaging with corresponding entity in the U-Spot device 303.

The U-Spot device 303 comprises suitable logic, circuitry and/or code that is operable to establish and service a U-Spot network. The U-Spot device 303 corresponds, for example, to any of the U-Spot servicing devices 121, 123, and/or 125, substantially as described with regard to, for example, FIG. 1. To enable performing U-Spot related operations via the U-Spot device 303, the U-Spot device 303 comprises a U-Spot server 303a. For example, the U-Spot server 303a comprises logic, circuitry, and/or code that enable performing dedicated server-side U-Spot related control and/or communication in the U-Spot device 303 to facilitate peer-to-peer type of connectivity between the U-Spot device 303 and the end-point device 301. The U-Spot server 303a is operable to enable exchanging messaging with corresponding entity in the end-point device 301.

The wired/wireless AP 305 comprises suitable logic, circuitry, and/or code that enable providing network accessibility via the U-Spot device 303, to one of more available networks. The wired/wireless AP 305 is operable, for example, to enable the U-Spot device 303 to access one of more available networks in the plurality of communication networks 111, to enable communication with the operator support server 307.

The operator support server 217 is substantially similar to the operator support server 151, as described with regard to, for example, FIGS. 1 and 2A. The operator support server 217 is operable to enable supporting and/or managing U-Spot network servicing operations.

In operation, the end-point device 301 joins a U-Spot network established via the U-Spot device 303 when the devices are within operational proximity of each other. Where the end-point device 301 lacks direct network accessibility, the end point device 301 establishes data sessions via the U-Spot device 303. The end-point device 301 sends, via the U-Spot client 301a, a Session_Request message 311 to the U-Spot device 303 to request establishment of data session via U-Spot device 303's network connectivity. The U-Spot device 303 then determines whether it is able to provide network connectivity, substantially as described with regard to, for example, FIG. 1. The U-Spot device 303 then communicates, via the wired/wireless AP 305, a 3rd_Party_Connection_Req message 313 to the operator support server 307, to indicate that a connection, via the U-Spot device 303, is requested on behalf of another device. The operator support server 307 responds with a Challenge (with intended response) message 315. The challenge message enables authentication of the requesting device, the end-point device 301. The challenge message requires the end-point device 301, via the Challenge message 317, to provide certain information, via the Response message 319, which is compared against the intended response provided in the Challenge message 315 and retained in the U-Spot device 303. In instances where the authentication is successful, the U-Spot device 303 communicates to the operator support server 307 a Response_Cfm_and_Account_Req message 321. This message confirms the success of the authentication, and request crediting and/or billing adjustment based on the services that are to be provided to the end-point device 301 via the U-Spot device 303. The operator support server 307 is operable to respond with an access granted message Access_Granted_and_Account_Start, 323 to indicate to the U-Spot device 303 that the end-point device 301 is granted network access, and to indicate that necessary accounting operations, billing and/or crediting, are initiated. The U-Spot device 303 is operable to send a session start message, Session_Start 325 to the end-point device 301 to authorize initiation of the session. During action session 327, the end-point device 301 sends and/or receives data 329 to the wired/wireless AP 305, via the U-Spot device 303.

In an exemplary aspect of the invention, the operator support server 307 is operable to utilize dedicated functionality and/or messaging to enable monitoring and/or validating, the crediting and/or the billing operations during U-Spot network servicing operations. The end-point device 301, for example, is required, to communicate periodic "encoded heartbeat" messages 331 to the operator support server 307. The encoded heartbeat utilizes, for example, an encoding/decoding algorithm is that only known to the end-point device 301 and the operator support server 307. Use of the "encoded heartbeat" messages 331 enables the operator support server 307 to track network access by the end-point device 301, to ensure that the end-point device 301 is billed and/or that the U-Spot device 303 is credited only to extent of actual servicing of the end-point device 301 via the U-Spot device 303.

To perform user-initiated session termination 333, the end-point device 301 sends a session end request message, Session_End_Req 335 to the U-Spot device 303. The U-Spot device 303 then sends a session end and accounting update request message, Session_End_and_Account_Update_Req 337 to the operator support server 307 to notify it of the termination of the data session, and to request completing accounting operations, including billing and/or crediting tracking functionality in the operator support server 307. The operator support server 307 then communicates back to the U-Spot device 303 an account update confirmation message, Update Cfm 339.

In some instances, the operator support server 307 is operable to perform operator-initiated session termination 341 by sending a Session_End message 343 to the U-Spot device 303. The operator-initiated session termination 341 is performed when operator support server determines that one or more conditions occur, for example heartbeat and/or decoding errors. The U-Spot device 303 then sends a send message indication message, Session_End_Ind 345 to the end-point device 301 to notify it of the termination of the data session.

Figure 3B:
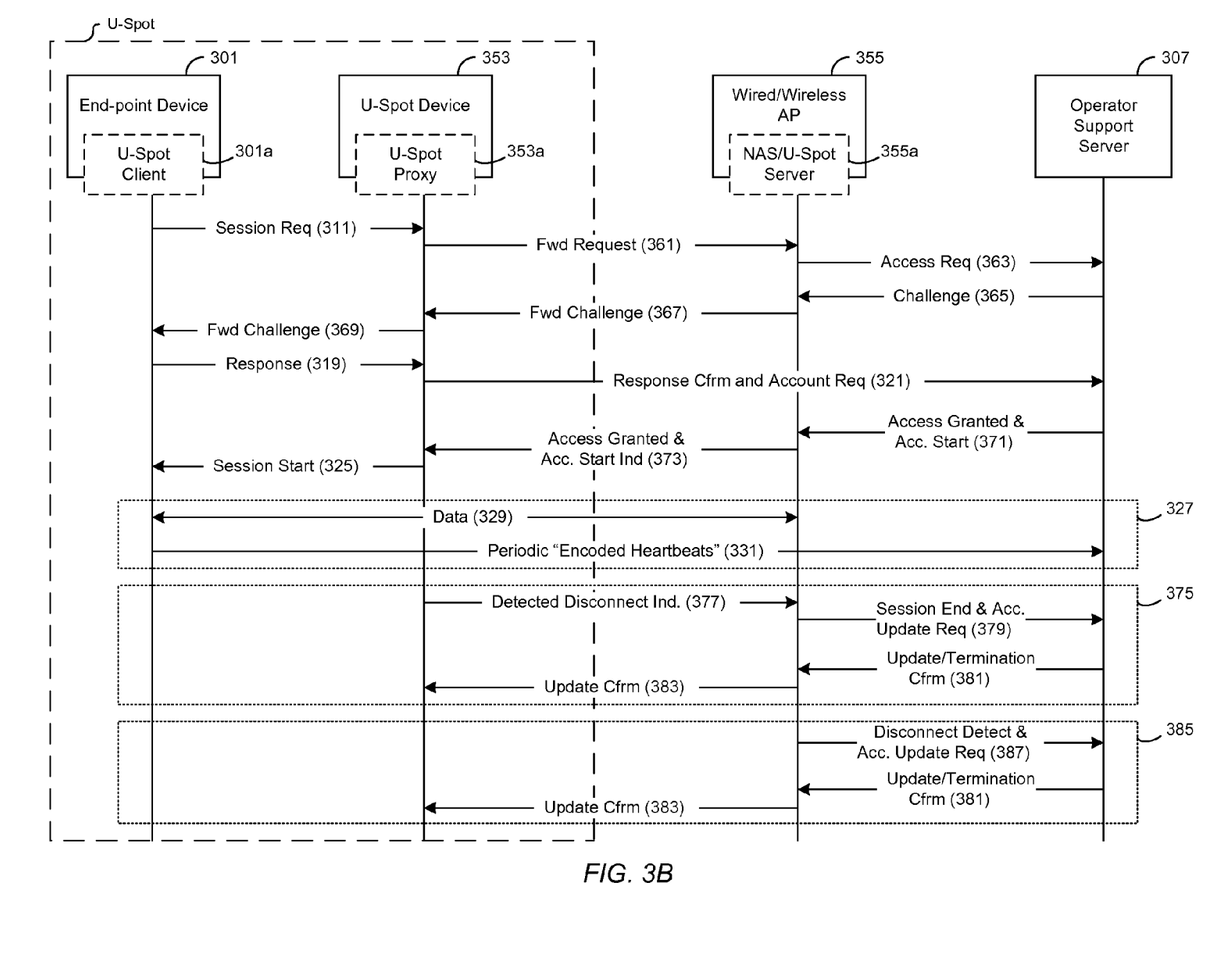
FIG. 3B is a diagram that illustrates an exemplary messaging sequence that enables establishment of service in an end-device via a U-Spot device that provides U-Spot proxy functionality, in accordance with an embodiment of the invention.

FIG. 3B is a diagram that illustrates an exemplary messaging sequence that enables establishing service in an end-point device via a U-Spot device that provides U-Spot proxy functionality, in accordance with an embodiment of the invention. Referring to FIG. 3B, there is shown a messaging flow chart that shows interactions between the end-point device 301, a U-Spot device 353, a wired/wireless access point (AP) 355, and the operator support server 307, to enable providing data session in the end-point device 301 when the U-Spot device 303 is utilized as proxy for a U-Spot server functionality running in the wired/wireless access point (AP) 355 to enable establishment of data sessions.

The end-point device 301, the U-Spot client 301a, and the operator support server 307 are substantially as described with regard to, for example, FIG. 2A. These entities, however, are also operable to enable interactions within U-Spot infrastructure that comprises the U-Spot device 353 and the wired/wireless AP 355.

The U-Spot device 353 is substantially similar to the U-Spot device 303, as described with regard to, for example, FIG. 2A. However, some of the U-Spot server related functionality performed in the U-Spot device 353, via the U-Spot server 303a, is moved out of the U-Spot device 353, into the wired/wireless AP 355. The U-Spot device 353 comprises a U-Spot proxy 333a to enable performing U-Spot related operations via the U-Spot device 353 in conjunction with U-Spot related functionality in the wired/wireless AP 355. For example, the U-Spot proxy 333a comprises logic, circuitry, and/or code that enable performing dedicated U-Spot related communication via the U-Spot device 353 to facilitate U-Spot based communication by the end-point device 301 and/or the wired/wireless AP 355.

The wired/wireless AP 355 is substantially similar to the wired/wireless AP 355, as described in FIG. 2A, and is operable to enable providing network accessibility via the U-Spot device 353. The wired/wireless AP 355 is operable, for example, to enable the U-Spot device 353 to access one of more available networks in the plurality of communication networks 111, to enable communication with the operator support server 307. Unlike the wired/wireless AP 305, however, the wired/wireless AP 355 is operable to perform at least some of the U-Spot server related functionality, via the network access server (NAS) U-Spot server 355a, that is operable via the U-Spot server 303a as described in FIG. 2A. For example, the NAS/U-Spot server 355a comprises logic, circuitry, and/or code that enable performing U-Spot dedicated network accessibility and server-side control and/or communication in the wired/wireless AP 355, to facilitate. The U-Spot server 355a is operable to enable the wired/wireless AP 355 to control U-Spot based interactions via the U-Spot device 353 and/or the end-point device 301.

In operation, the end-point device 301 joins a U-Spot network established via the U-Spot device 353 when the devices are within operational proximity of each other. Where the end-point device 301 lacks direct network accessibility, the end point device 301 establishes data sessions via the U-Spot device 353. The end-point device 301 sends, via the U-Spot client 301a, the Session_Request message 311 to the U-Spot device 353 to request establishment of data session via U-Spot device 353's network connectivity. The U-Spot device 353 then sends, via the U-Spot proxy 353a, a forward request message, Forward_Request 361 to the wired/wireless AP 355 indicating the session request made by the end-point device 301. The wired/wireless AP 355 processes the Forward_Request message 361, and determines whether to enable network connectivity via the U-Spot device 353. The wired/wireless AP 355 then sends an access request message, Access_Request message 363 to the operator support server 307, to indicate that a connection, via the U-Spot device 353, is requested on behalf of another device, the end-point device 301. A challenge sequence, substantially similar to the challenge sequence described in FIG. 3A, is then performed, via a Challenge message 365, a forward challenge message, Forward_Challenge message 367, a Forward_Challenge message 369, the Response message 319, and the Response_Cfm_and_Account_Req message 321. Once the challenge sequence and accounting request processing is performed successfully via the operator support server 307, the operator support server 307 communicates an access granted and account start message, Access_Granted_and_Account_Start 371, to the wired/wireless AP 355, to indicate that the end-point device 301 is granted network access and/or to indicate that necessary accounting operations, billing and/or crediting, are initiated. The wired/wireless AP 355 sends an access grant message, Access_Grant 373 to the U-Spot device 355, and the U-Spot device 353 sends the Session_Start message 325 to the end-point device 301 to authorize initiation of the session. During action session 327, the end-point device 301 sends and/or receives data 329 to the wired/wireless AP 305, via the U-Spot device 353. Additionally, periodic "encoded heartbeat" messages 331 are utilized to monitor and/or validate billing and/or crediting operations during U-Spot network servicing operations, substantially as described with regard to, for example, FIG. 3A.

In an exemplary embodiment of the invention, the U-Spot device 353 operable to perform U-Spot initiated session termination 375. Where a session disconnection is detected via the U-Spot device 353, the U-Spot device 353 sends a detected disconnect indication message, Detected_Disonnect_Ind 377 to the wired/wireless AP 355. The wired/wireless AP 355 communicates a session end and account update request message, Session_End_and_Account_Update_Req 379 to the operator support server 307 to notify it of the termination of the data session, and to request completion of accounting operations, including billing and/or crediting tracking functions in the operator support server 307. The operator support server 307 communicates an account update and termination confirmation message, Account_Update_and_Termination_Cfm 381 back to the wired/wireless AP 355, and the wired/wireless AP 355 forwards an Account_Update message 383 to the U-Spot device 353.

In some instances, the wired/wireless AP 355 is operable to perform AP initiated session termination 385. Where a session disconnection is detected via the wired/wireless AP 355, the wired/wireless AP 355 sends a Detected_Disonnect_and_Account_Update_Req message 387 to the operator support server 307 to notify it of the termination of the data session, and to request completing accounting operations, including billing and/or crediting tracking functionality in the operator support server 307. The operator support server 307 communicates back to the wired/wireless AP 355 an Account_Update_and_Termination_Cfm message 381, and the wired/wireless AP 355 forwards an Account_Update message 383 to the U-Spot device 353.

Figure 4:
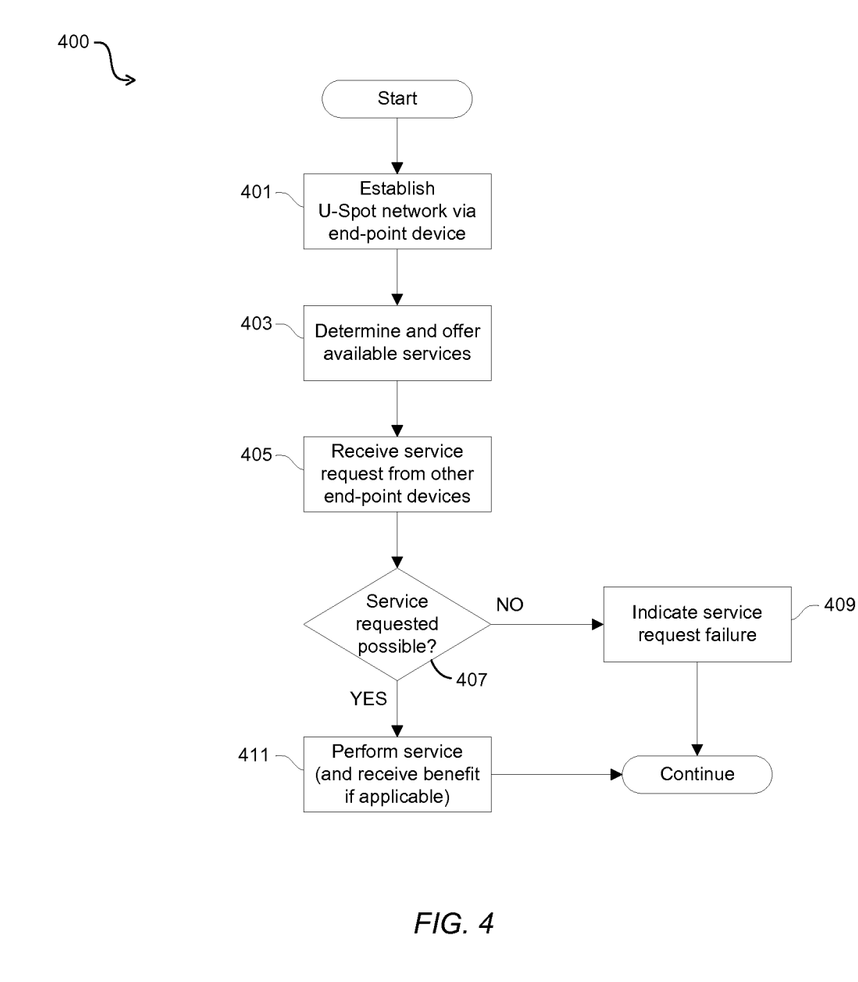
FIG. 4 is a flow chart that illustrates an exemplary setup for providing user-spot (U-Spot) services, which is utilized in accordance with an embodiment of the invention.

FIG. 4 is a flow chart that illustrates an exemplary setup for providing user spot (U-Spot) services, in accordance with an embodiment of the invention. Referring to FIG. 4, there is shown a flow chart 400 comprising a plurality of exemplary steps, which enable establishment of U-Spot network via end-point device to enable providing user spot (U-Spot) services.

In step 401, a U-Spot network is established via a user end-point device. For example, the U-Spot servicing devices 121, 123, and/or 125 are operable to establish the U-Spot networks 131, 133, and/or 135, substantially as described with regard to, for example, FIG. 1. In step 403, the U-Spot servicing device determines and offers available services in the corresponding U-Spot network. For example, the U-Spot servicing devices 121, 123, and/or 125 determine services that are available, via these devices, in the U-Spot networks 131, 133, and/or 135. The determination of the availability of services is based on a plurality of factors comprising network access available via the U-Spot servicing devices, use and/or operational requirements for performing tasks requested by users of the U-Spot servicing devices within their capacity as user end-point devices, and/or incentives offered and/or accepted for providing the services. The determined services, and/or any additional criteria for availing such service, are offered in the U-Spot network, via advertising beacon signals, broadcast messages, and multicast messages and/or via personalized interface, substantially as described with regard to, for example, FIG. 1. In step 405, a service request is received by one or more U-Spot servicing devices from one or more of the end-point devices in the U-Spot network. For example, the communication devices 141, 143, 145, 147, and/or 149 request services in the U-Spot networks 131, 133, and/or 135, via the U-Spot servicing devices 121, 123, and/or 125.

In step 407, it is determined whether the requested U-Spot service can be provided. For example, the U-Spot servicing devices 121, 123, and/or 125 are operable to determine whether the services requested by one or more communication devices are available. The determination is based, for example, on network access availability, available processing power, available bandwidth, latency, QOS, competing requests among the communication devices and/or users of the U-Spot servicing devices 121, 123, and/or 125, and/or incentives that are available for the U-Spot servicing devices 121, 123, and/or 125, via the operator support server 151, for example. In an exemplary aspect of the invention, a handshake type of negotiation is performed between the U-Spot servicing devices and the requesting communication devices, to negotiate better incentive arrangement that is sufficient to overcome initial rejections of service. In instances where the requested U-Spot service is unavailable, the exemplary steps proceed to step 409. In step 409, a service rejection indication is communicated back to the requesting end-point device.

Returning to step 407, instances where the requested U-Spot service is available, the exemplary steps proceed to step 411. In step 411, the requested service is initiated via the U-Spot network. In an exemplary of the invention, crediting and/or billing operations are performed to enable the U-Spot servicing devices to receive pay and/or credit, and/or to enable debiting accounts corresponding to the requesting end-point devices, substantially as described with regard to, for example, FIG. 1. Additionally, crediting validation operations are performed to ensure that U-Spot servicing devices are only accredited for actual services provided to the requesting end-point devices, substantially as described with regard to, for example, FIGS. 3A and 3B.

Various embodiments of the invention comprise a method and system for providing user-spot (U-Spot) services in a communication system. U-Spot servicing devices 121, 123, and/or 125 are operable to establish the U-Spot networks 131, 133, and/or 135. In such U-Spot networks, the U-Spot servicing devices are operable to determine services that are available to communication devices, for example the communication devices 141, 143, 145, 147, and/or 149, when these devices are operable to become communicatively coupled to the U-Spot servicing devices 121, 123, and/or 125, via wired and/or wireless links. The services are based on network access, data and/or functionality that is available via the U-Spot servicing devices 121, 123, and/or 125. Availability of the services is advertised in the U-Spot networks 131, 133, and/or 135, via the U-Spot servicing devices 121, 123, and/or 125. The advertisement operations are performed via beacons and/or utilizing personalized interfaces. The secondary advertising server 161 is operable to advertise content and/or functionality via the advertising functionality in the U-Spot servicing devices 121, 123, and/or 125. The offering and/or seeking of services in the U-Spot networks 131, 133, and/or 135 is incentivized to the U-Spot servicing devices 121, 123, and/or 125, and/or to the communication devices 141, 143, 145, 147, and/or 149. The U-Spot servicing devices 121, 123, and/or 125 are operable to request and/or receive pay and/or credit for providing U-Spot services. Additionally, accounts corresponding to the communication devices 141, 143, 145, 147, and/or 149 are debited based on services received via the U-Spot networks 131, 133, and/or 135. One or more instances of the operator support server 151 is operable to enable supporting and/or managing U-Spot servicing operations. The operator support server 151 is operable, for example, to manage user accounts and/or network access provided via the U-Spot networks 131, 133, and/or 135; and/or to manage crediting/billing operations based on U-Spot servicing operations.

The U-Spot servicing devices 121, 123, and/or 125 are operable to establish the U-Spot networks 131, 133, and/or 135, respectively. The U-Spot networks 131, 133, and/or 135 are accessible by one or more of the communication devices 141, 143, 145, 147, and/or 149 when these devices are communicatively coupled to the U-Spot servicing devices 121, 123, and/or 125. The U-Spot servicing devices are operable to determine one or more services that are provided via the U-Spot networks, and the determine services are advertised in the U-Spot networks, via personalized interfaces for example. The U-Spot servicing devices and/or the communication devices are operable to receive incentives for providing services within the U-Spot networks. The incentives comprise network accessibility, data accessibility, and/or bandwidth availability.

The U-Spot servicing devices 121, 123, and/or 125 are also operable to receive payment and/or credit for providing services within the U-Spot networks. The U-Spot servicing devices 121, 123, and/or 125 are operable to manage services provided in the U-Spot networks. This management comprises, for example, providing access to, blocking, limiting and/or modifying one or more of the determined services. The service management is based on a plurality of resources and/or incentives associated with U-Spot servicing devices 121, 123, and/or 125; and/or with one or more of the requesting communication devices. The plurality of resources relevant to the service management comprise display capability, audio processing capability, video processing capability, available memory, available bandwidth, and processing bandwidth. Communication among the U-Spot servicing devices and/or the communication devices is secured, wherein various authentication and/or validation operations are utilized to authenticate users, network access, and/or billing/crediting adjustments. The personalized interfaces used in the U-Spot servicing devices 121, 123, and/or 125 are operable to enable secondary devices, for example the secondary advertising server 161, to advertise functionality and/or content via the U-Spot servicing devices.

Another embodiment of the invention may provide a machine and/or computer readable storage and/or medium, having stored thereon, a machine code and/or a computer program having at least one code section executable by a machine and/or a computer, thereby causing the machine and/or computer to perform the steps as described herein for providing user-spot (U-Spot) services in a communication system.

Accordingly, the present invention may be realized in hardware, software, or a combination of hardware and software. The present invention may be realized in a centralized fashion in at least one computer system or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method comprising:
at a mobile communication device,
establishing data communication with a network servicing device over a serving network;
establishing a user network accessible by one or more communication devices for providing network services over the serving network from the network servicing device to respective communication devices of the one or more communication devices over the user network, including:
receiving, from a respective communication device over the user network, data defining a session request message,
in response to receiving the session request message, communicating data defining a connection request message over the serving network to the network servicing device;
receiving, over the serving network, data defining an access granted message from the network servicing device; and
in response to receiving the access granted message, communicating data to the respective communication device over the user network to provide services from the network servicing device to the respective communication device.

2. The method of claim 1 further comprising:
at the mobile communication device, communicating over the user network to the one or more communication devices data advertising network services available from the network servicing device.

3. The method of claim 2 wherein communicating data advertising network services comprises broadcasting beacon signals including information advertising the network services available in the user network.

4. The method of claim 2 wherein communicating data advertising network services comprises:
at the mobile communication device,
creating a web page including information advertising the network services available in the user network; and
communicating data over the user network to one or more respective communication devices.

5. The method of claim 2 wherein communicating data advertising network services comprises:
at the mobile communication device,
creating a personalized interface including a web page including information advertising the network services available in the user network; and
communicating data defining the web page over the user network to a respective communication device of the one or more communication devices.

6. The method of claim 5 further comprising:
at the mobile communication device,
receiving, over the user network from the respective communication device, data of the personalized interface, the data defining a user inquiry about available network services.

7. The method of claim 2 further comprising:
at the mobile communication device,
receiving, from the network servicing device over the serving network, data defining an advertising web page including data about network services available over the serving network;
creating a personalized interface for a selected communication device of the one or more communication devices; and
communicating data defining the advertising web page over the user network to the selected communication device.

8. The method of claim 7 further comprising:
at the mobile communication device,
providing over the personalized interface to the selected communication device data defining incentives.

9. A mobile communication device comprising circuits to receive a wireless communication over a serving network from a network servicing device, the wireless communication including data defining advertisement of network services available over the serving network;
circuits to create a personalized interface for the respective communication device for communication between the respective communication device and the mobile communication device;
circuits to establish a local network to provide data communication and network services to one or more communication devices proximate the mobile communication device;
circuits to broadcast data about the network services available over the serving network to the one or more communication devices proximate the mobile communication device; and
circuits to receive from a respective communication device of the one or more communication devices, using the personalized interface of the respective communication device, an inquiry about the network services available to the respective communication device over the serving network and the mobile communication device.

10. The mobile communication device of claim 9 wherein the circuits to create a personalized interface comprise:
circuits to create a service advertisement web page using the data defining advertisement of the network services available over the user network,
and wherein the circuits to broadcast data about the network services comprise:
circuits to broadcast data defining the service advertisement web page to the one or more communication devices in the local network.

11. The mobile communication device of claim 10 wherein the circuits to receive an inquiry comprise circuits to receive from the respective communication device a web-based communication including the inquiry about the network services available to the respective communication device over the serving network and the mobile communication device.

12. The mobile communication device of claim 9 wherein the circuits to receive a wireless communication over the serving network from the network servicing device comprise circuits to receive from the network servicing device data defining an advertising web page including data about network services available over the serving network.

13. The mobile communication device of claim 12 wherein the circuits to broadcast data about the network services comprise circuits to communicate data defining the advertising web page over the user network to the one or more communication devices proximate the mobile communication device.

14. The mobile communication device of claim 9 further comprising circuits to negotiate incentivized arrangements with the respective communication device.

15. The mobile communication device of claim 9 further comprising circuits to negotiate incentivized arrangements with the network servicing device.

16. The mobile communication device of claim 9 wherein the circuits to create a personalized interface are configured to throttle bandwidth allocation among the communication devices including the respective communication device.

17. The mobile communication device of claim 9 further comprising circuits to request or receive payment or credit for providing services from the network servicing device to the respective communication device.

18. A method comprising:
at an operation support server in data communication over a serving network with a mobile communication device, the mobile communication device configured to establish a local network with one or more communication devices,
receiving a connection request message from the mobile communication device, the connection request generated by the mobile communication device in response to receipt by the mobile communication device of a session request message from a respective communication device over the local network;
providing a challenge message to the mobile communication device;
verifying a response to the challenge message received from the mobile communication device to enable network access by the respective communication device; and
establishing an account for the respective communication device for management of service provision to the respective communication device over the serving network and the local network.

19. The method of claim 18 further comprising:
at the operation support server, receiving from the mobile communication device a request for billing adjustments to the account for the respective communication based on network services provided over the local network to the respective communication device by the mobile communication device.

20. The method of claim 18 further comprising:
at the operation support server, creating an advertising web page including data defining network services available over the serving network to the respective communication device; and
pushing the advertising web page to the mobile communication device for communication to the respective communication device.

* * * * *